United States Patent
Bushman (10) Patent No.: US 9,917,688 B2
(45) Date of Patent: *Mar. 13, 2018

(54) CONSOLIDATING ENCRYPTED IMAGE BACKUPS WITHOUT DECRYPTION

(71) Applicant: STORAGECRAFT TECHNOLOGY CORPORATION, Draper, UT (US)

(72) Inventor: Nathan S. Bushman, Pleasant Grove, UT (US)

(73) Assignee: STORAGECRAFT TECHNOLOGY CORPORATION, Draper, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/605,681

(22) Filed: May 25, 2017

(65) Prior Publication Data

US 2017/0359167 A1    Dec. 14, 2017

Related U.S. Application Data

(63) Continuation of application No. 15/182,293, filed on Jun. 14, 2016.

(51) Int. Cl.
| | | |
|---|---|---|
| *H04L 9/00* | (2006.01) | |
| *H04L 9/06* | (2006.01) | |
| *G06F 21/60* | (2013.01) | |
| *H04L 29/06* | (2006.01) | |

(52) U.S. Cl.
CPC .......... *H04L 9/0631* (2013.01); *G06F 21/602* (2013.01); *G06F 2212/1052* (2013.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 7,934,064 B1* | 4/2011 | Per | ...................... | G06F 11/1451 707/641 |
| 8,797,668 B1* | 8/2014 | Grinchuk | ........... | H03M 13/1102 360/46 |
| 8,943,441 B1* | 1/2015 | Patrick | .................. | G06F 3/0484 345/440 |
| 9,003,200 B1* | 4/2015 | Gardner | .............. | G06F 11/1453 713/189 |
| 2013/0103945 A1* | 4/2013 | Cannon | ............... | G06F 21/6209 713/168 |
| 2014/0281545 A1* | 9/2014 | Erofeev | .............. | G06F 21/6218 713/171 |

* cited by examiner

*Primary Examiner* — Hadi Armouche
*Assistant Examiner* — Andrew Steinle
(74) *Attorney, Agent, or Firm* — Maschoff Brennan (57) ABSTRACT

Consolidating encrypted image backups without decryption. In one example embodiment, a method for consolidating encrypted image backups without decryption may include individually encrypting, using a single encryption key, each block in a first set of blocks in a source storage, storing the first set of encrypted blocks in a first encrypted image backup, individually encrypting, using the single encryption key, each block in a second set of blocks in the source storage, storing the second set of encrypted blocks in a second encrypted image backup, and creating a consolidated encrypted image backup that includes a single encrypted block for each of multiple unique block positions represented by the first and second sets of encrypted blocks without decrypting any of the encrypted blocks.

20 Claims, 6 Drawing Sheets

CONSOLIDATING ENCRYPTED IMAGE BACKUPS WITHOUT DECRYPTION

CROSS-REFERENCE TO A RELATED APPLICATION

This application is a continuation of U.S. patent application Ser. No. 15/182,293, filed Jun. 14, 2016, which is incorporated herein by reference in its entirety.

FIELD

The embodiments disclosed herein relate to consolidating encrypted image backups without decryption.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not generally need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up the content of individual files may be scattered, resulting in relatively extensive seeking.

One common problem encountered when backing up a source storage using image backup is the vulnerability caused by unencrypted data. For example, plain-text data of a source storage operated by an individual or business may be backed up into an image backup and then sent over a network to a third-party destination storage. However, the unencrypted data in the image backup may be vulnerable to being accessed by unauthorized users, and since the data is not encrypted, the unauthorized access can be devastating to the individual or the business. This problem has been mitigated to some extent by encryption schemes which are employed to encrypt runs of multiple blocks as a group before storing the runs in an image backup that is then stored on a third-party destination storage.

Another common problem encountered when repeatedly backing up a source storage using image backup is the proliferation of image backups over time. For example, where a source storage is backed up every day at 2:00 am to a third-party destination storage, at the end of one year, 365 image backups will exist for the source storage on the third-party destination storage. This proliferation of image backups can increase the amount of storage space needed to store the image backups on the third-party destination storage. This problem has been mitigated to some extent by consolidation schemes which are employed to consolidate multiple image backups into a single image backup, thus reducing the number of image backups and saving storage space. For example, the daily image backups discussed above can be consolidated into consolidated monthly image backups, thereby reducing the 365 image backups to 12 consolidated image backups.

However, in a situation where an image backup includes runs of multiple blocks which have been encrypted as a group, consolidating multiple image backups into a single image backup may be impossible without first accessing the encryption key that was used in the encryption of the runs and using the encryption key to decrypt the runs. Understandably, some individuals and businesses may be hesitant to provide a third-party destination storage access to an encryption key, since the encryption key can be used by unauthorized users to decrypt the data in the encrypted image backup, thereby exposing the encrypted image backup to the very vulnerabilities that the encryption was intended to avoid. Therefore, since current image backup solutions require that access be provided to an encryption key if consolidation of encrypted image backups is desired, many individuals and businesses choose to forfeit consolidation of encrypted image backups on third-party destination storages in order to avoid the security risk of permitting third parties access to encryption keys. This forfeiture results in a proliferation of image backups that can increase the amount of space needed to store the image backups on a third-party destination storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to consolidating encrypted image backups without decryption. The example embodiments disclosed herein may be employed to individually encrypt individual blocks in a source storage before storing the encrypted blocks in encrypted image backups on a third-party destination storage. Then, the encrypted image backups can later be consolidated without the third party decrypting any of the encrypted blocks. Therefore, the example embodiments disclosed herein may enable consolidation by a third party on a third-party destination storage without the third party having access to an encryption key and without exposing the encrypted image backup to the vulnerabilities that such access may entail. This consolidation may reduce the proliferation of image backups and thereby also reduce the amount of space needed to store the image backups on the third-party destination storage.

In one example embodiment, a method for consolidating encrypted image backups without decryption may include individually encrypting, using a single encryption key, each block in a first set of blocks in a source storage, storing the first set of encrypted blocks in a first encrypted image backup, individually encrypting, using the single encryption key, each block in a second set of blocks in the source storage, storing the second set of encrypted blocks in a second encrypted image backup, and creating a consolidated encrypted image backup that includes a single encrypted block for each of multiple unique block positions represented by the first and second sets of encrypted blocks without decrypting any of the encrypted blocks.

In another example embodiment, a method for consolidating encrypted image backups in an image backup chain without decryption may include individually encrypting, using a single encryption function and a single encryption key, each block in a first set of blocks in a source storage, storing the first set of encrypted blocks in a first encrypted image backup in an image backup chain, individually encrypting, using the single encryption function and the single encryption key, each block in a second set of blocks in the source storage, storing the second set of encrypted blocks in a second encrypted image backup in the image backup chain, and creating a consolidated encrypted image backup in the image backup chain that includes a single encrypted block for each of multiple unique block positions represented by the first and second sets of encrypted blocks without decrypting any of the encrypted blocks.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media capable of storing data in blocks, such as one or more floppy disks, optical disks, magnetic disks, or solid state (flash) disks, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data, such as file content data or metadata, by a file system of the storage. The term "free block" as used herein refers to a block in a storage that is not currently tracked as storing data, such as file content data or metadata, by a file system of the storage. The term "backup" when used herein as a noun refers to a copy or copies of one or more blocks from a storage. The term "full image backup" as used herein refers to a full image backup of a storage that includes at least a copy of each unique allocated block of the storage at a point in time such that the full image backup can be restored on its own to recreate the state of the storage at the point in time, without being dependent on any other backup. A "full image backup" may also include nonunique allocated blocks and free blocks of the storage at the point in time. An example file format for a "full image backup" is the ShadowProtect Full (SPF) image backup format. The term "incremental image backup" as used herein refers to an at least partial backup of a storage that includes at least a copy of each unique allocated block of the storage that was changed between a previous point in time of a previous backup of the storage and the subsequent point in time of the incremental image backup, such that the incremental image backup, along with all previous image backups of the storage, including an initial full image backup of the storage, can be restored together as an incremental image backup chain to recreate the state of the storage at the subsequent point in time. An "incremental image backup" may also include nonunique allocated blocks and free blocks of the storage that were changed between the previous point in time and the subsequent point in time. An example file format for an "incremental image backup" is the ShadowProtect Incremental (SPI) image backup format. The term "changed block" as used herein refers to a block that was changed either because the block was previously allocated and changed or because the block was changed by being newly allocated. The term "decremental image backup" as used herein refers to an at least partial backup of a storage that includes at least a copy of each unique allocated block from a full image backup of the storage that corresponds to a block that was changed in the source storage between a previous point in time and a subsequent point in time, such that the decremental image backup, along with all subsequent image backups of the storage, including a full image backup of the storage, can be restored together as a decremental image backup chain to recreate the state of the storage at the previous point in time. A "decremental image backup" may also include nonunique allocated blocks and free blocks from a full image backup of the storage that correspond to blocks that were changed in the source storage between the point in time and the subsequent point in time. It is understood that a "full image backup," an "incremental image backup," and/or a "decremental image backup" may exclude certain undesired allocated blocks such as content blocks belonging to files whose contents are not necessary for restoration purposes, such as virtual memory pagination files and machine hibernation state files.

Figure 1:
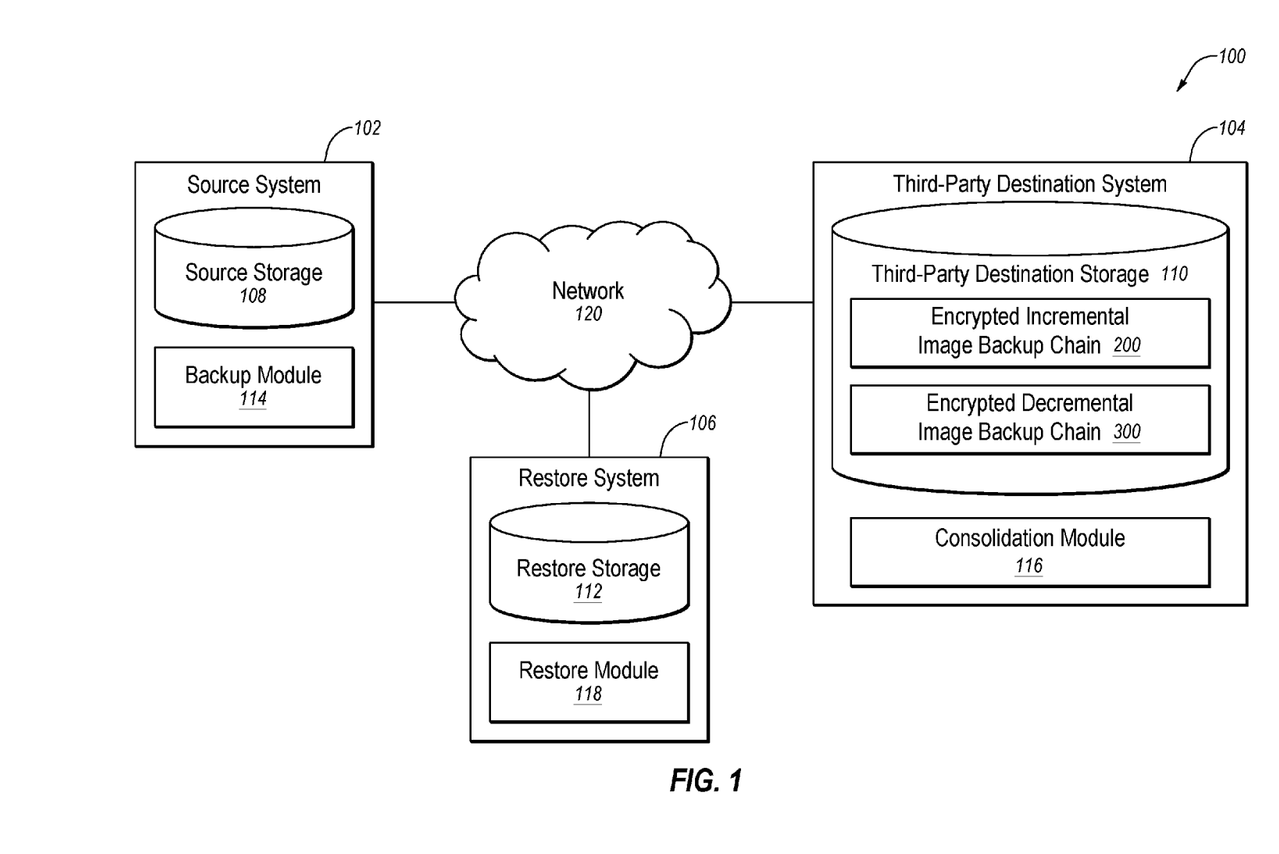
FIG. 1 is a schematic block diagram illustrating an example image backup and restore system.

FIG. 1 is a schematic block diagram illustrating an example image backup and restore system 100. As disclosed in FIG. 1, the system 100 may include a source system 102, a third-party destination system 104, and a restore system 106. The systems 102, 104, and 106 may include storages 108, 110, and 112, respectively. The source system 102 may also include a backup module 114, the third-party destination system 104 may also include a consolidation module 116, and the restore system 106 may also include a restore module 118. The systems 102, 104, and 106 may be configured to communicate with one another over a network 120.

The third-party destination storage 110 may store one or more image backups of the source storage 108. For example, the third-party destination storage 110 may store an encrypted incremental image backup chain 200 and/or an encrypted decremental image backup chain 300. Any of the encrypted image backups in the encrypted incremental image backup chain 200 or the encrypted decremental image backup chain 300 may be restored to the restore storage 112.

Each of the systems 102, 104, and 106 may be any computing device capable of supporting a storage and capable of communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines running on hypervisors. The network 120 may be any wired or wireless communication network including, for example, a Local Area Network (LAN), a Metropolitan Area Network (MAN), a Wide Area Network (WAN), a Wireless Application Protocol (WAP) network, a BLUETOOTH® network that employs a wireless data transmission protocol that communicates data using short-wavelength ultra high frequency (UHF) radio waves in the 2.4 GHz industrial, scientific and medical (ISM) frequency band, an Internet Protocol (IP) network such as the Internet, or some combination thereof. The network 120 may also be a network emulation of a hypervisor over which one or more virtual machines and/or physical machines may communicate.

The encrypted incremental image backup chain 200 and/or the encrypted decremental image backup chain 300 stored in the third-party destination storage 110 may be created by the backup module 114. For example, the backup module 114 may be one or more programs that are configured, when executed, to cause one or more processors to perform image backup operations of creating an encrypted full image backup and one or more encrypted incremental image backups of the source storage 108 resulting in the encrypted incremental image backup chain 200, and/or creating an encrypted full image backup and one or more encrypted decremental image backups of the source storage 108 resulting in the encrypted decremental image backup chain 300. It is noted that these image backups may initially be created on the source system 102 and then copied to the third-party destination system 104.

In one example embodiment, the third-party destination system 104 may be a third-party network server, the source system 102 may be a first desktop computer, the source storage 108 may be a volume on one or more magnetic hard drives or solid state drives of the first desktop computer, the restore system 106 may be a second desktop computer, the restore storage 112 may be a volume on one or more magnetic hard drives or solid state drives of the second desktop computer, and the network 120 may include the Internet. In this example embodiment, the first desktop computer may be configured to periodically back up the volume of the first desktop computer over the Internet to the third-party network server as part of a backup job by creating the encrypted incremental image backup chain 200 and/or the encrypted decremental image backup chain 300 and storing the encrypted image backup chains on the third-party network server. The first desktop computer may also be configured to track incremental changes to its volume between backups in order to easily and quickly identify only those blocks that were changed for use in the creation of an encrypted incremental image backup or an encrypted decremental image backup. The third-party network server may be configured to periodically consolidate two or more encrypted image backups in the encrypted incremental image backup chain 200 and/or the encrypted decremental image backup chain 300. The second desktop computer may also be configured to restore one or more of the encrypted image backups from the third-party network server over the Internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system, including embodiments where the source storage 108 represents the same storage as the restore storage 112. Further, although the backup module 114, the consolidation module 116, and the restore module 118 are the only modules disclosed in the system 100 of FIG. 1, it is understood that the functionality of the modules 114, 116, and 118 may be replaced or augmented by one or more similar modules residing on any of the systems 102, 104, or 106 or another system. Also, although only a single source storage and a single restore storage are disclosed in the system 100 of FIG. 1, it is understood that the third-party destination system 104 of FIG. 1 may be configured to simultaneously back up multiple source storages and/or to simultaneously restore to multiple restore storages. Further, although the third-party destination system 104 and the third-party destination storage 110 are disclosed in FIG. 1 as being operated by a third-party, it is understood that this system and its storage may instead be operated by the same individual or business that operates the source system 102 and/or the restore system 106.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2A:
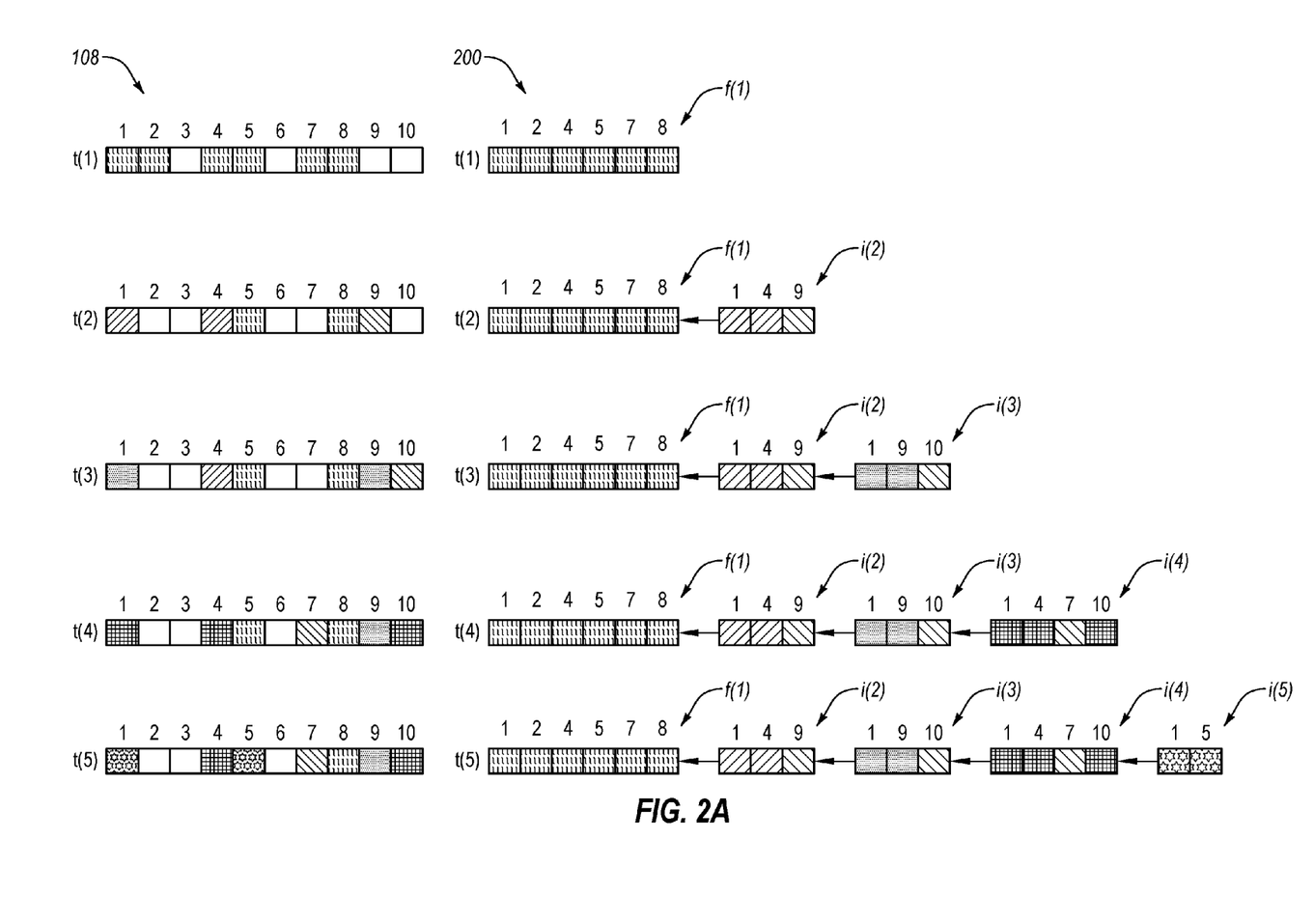
FIG. 2A is a schematic block diagram illustrating an example source storage and an example encrypted incremental image backup chain.

FIG. 2A is a schematic block diagram illustrating the example source storage 108 and the example encrypted incremental image backup chain 200 of FIG. 1. In particular, FIG. 2A discloses the states of the source storage 108 at times t(1), t(2), t(3), t(4), and t(5) and discloses the example encrypted incremental image backup chain 200 representing the states of the source storage 108 at times t(1), t(2), t(3), t(4), and t(5). As disclosed in FIGS. 2A, 2B, 3A, and 3B, blocks that are allocated are illustrated with a hatch pattern, and blocks that are free are illustrated as blank. For example, at time t(2), blocks (1), (4), (5), (8), and (9) are allocated and blocks (2), (3), (6), (7), and (10) are free. Further, where a hatch pattern changes from one point in time to the next, this change illustrates that the block has changed between the two points in time. For example, the change in hatch pattern between block (4) at time t(1) and block (4) at time t(2) illustrates that block (4) changed (i.e., was written to) between time t(1) and time t(2).

As disclosed in FIG. 2A, the example encrypted incremental image backup chain 200 includes an encrypted full image backup f(1), which represents the state of the source storage 108 at time t(1). In addition, the encrypted incremental image backup chain 200 includes encrypted incremental image backups i(2), i(3), i(4), and i(5), which represent the states of the source storage 108 at times t(2), t(3), t(4), and t(5), respectively. In one example embodiment, the backup module 114 of FIG. 1 creates the encrypted full image backup f(1) and the encrypted incremental image backups i(2), i(3), i(4), and i(5) of the source storage 108 and stores them in the third-party destination storage 110.

As disclosed in FIGS. 1 and 2A, the encrypted full image backup f(1) may be created to capture the state of the source storage 108 at time t(1). This creation of the encrypted full image backup f(1) may include the backup module 114 copying all allocated blocks of the source storage 108 as allocated at time t(1), individually encrypting the allocated blocks, and storing the encrypted blocks in the third-party destination storage 110. The individual encryption of blocks during the creation of the encrypted full image backup f(1) may be performed using a single encryption function and/or a single encryption key. The state of the source storage 108 at time t(1) may be captured using snapshot technology in order to capture the data stored in the source storage 108 at time t(1) without interrupting other processes, thus avoiding downtime of the source storage 108. In this example, blocks (1), (2), (4), (5), (7), and (8) are allocated in the source storage 108 at time t(1), and these allocated blocks are therefore individually encrypted and stored as part of the encrypted full image backup f(1). The encrypted full image backup f(1) may be very large depending on the size of the source storage 108 and the number of allocated blocks at time t(1). As a result, the encrypted full image backup f(1) may take a relatively long time to create and consume a relatively large amount of space in the third-party destination storage 110.

Next, the encrypted incremental image backup i(2) may be created to capture the state at time t(2). This may include the backup module 114 copying only changed allocated blocks of the source storage 108 present at time t(2), individually encrypting the changed allocated blocks, and storing the encrypted blocks in the third-party destination storage 110. The individual encryption of blocks during the creation of the encrypted incremental image backup i(2) may be performed using the single encryption function and/or the single encryption key that was used during the creation of encrypted full image backup f(1). The state of the source storage 108 at time t(2) may also be captured using a snapshot, thus avoiding downtime of the source storage 108. The encrypted incremental image backup i(2) may include only those allocated blocks from the source storage 108 that were changed between time t(1) and time t(2). In this example, blocks (1), (4), and (9) are changed in the source storage 108 between time t(1) and time t(2), as indicated in FIG. 2A by the hatch patterns of blocks (1) and (4) at time t(2) that differ from the hatch patterns at time t(1) and as indicated by the hatch pattern of block (9) at time t(2) that differs from the blank block (9) at time t(1). Blocks (1), (4), and (9) are therefore individually encrypted and stored as part of the encrypted incremental image backup i(2). In general, as compared to the encrypted full image backup f(1), the encrypted incremental image backup i(2) may take a relatively short time to create and consume a relatively small storage space in the third-party destination storage 110.

Further, additional encrypted incremental image backups, such as the encrypted incremental image backups i(3), i(4), and i(5), may be created in the encrypted incremental image backup chain 200 on an ongoing basis, in a manner similar to the creation of the encrypted incremental image backup i(2). The frequency of creating new encrypted incremental image backups in the encrypted incremental image backup chain 200 may be altered as desired in order to adjust the amount of data that will be lost should the source storage 108 experience corruption of its stored blocks or become unavailable at any given point in time. The blocks from the source storage 108 can be restored to the state at the point in time of a particular encrypted incremental image backup by applying the image backups to the restore storage 112 from oldest to newest, namely, first applying the encrypted full image backup f(1) and then applying each successive encrypted incremental image backup up to the particular encrypted incremental image backup. For example, the data from the source storage 108 can be restored to the state at time t(4) by applying the encrypted full image backup f(1) and then successively applying the encrypted incremental image backups i(2), i(3), and i(4). Alternatively, the blocks from the source storage 108 can be restored to the state at the point in time of a particular encrypted incremental image backup by applying the image backups to the restore storage 112 concurrently, namely, concurrently applying the encrypted full image backup f(1) and each successive encrypted incremental image backup up to the particular encrypted incremental image backup. For example, the data from the source storage 108 can be restored to the state at time t(4) by accessing the encrypted full image backup f(1) and the encrypted incremental image backups i(2), i(3), and i(4) concurrently, and retrieving from each backup the correct block content corresponding to time t(4). It is understood that any such restoration of an encrypted image backup may also include not decrypting any encrypted blocks, or decrypting some or all of the encrypted blocks.

Figure 2B:
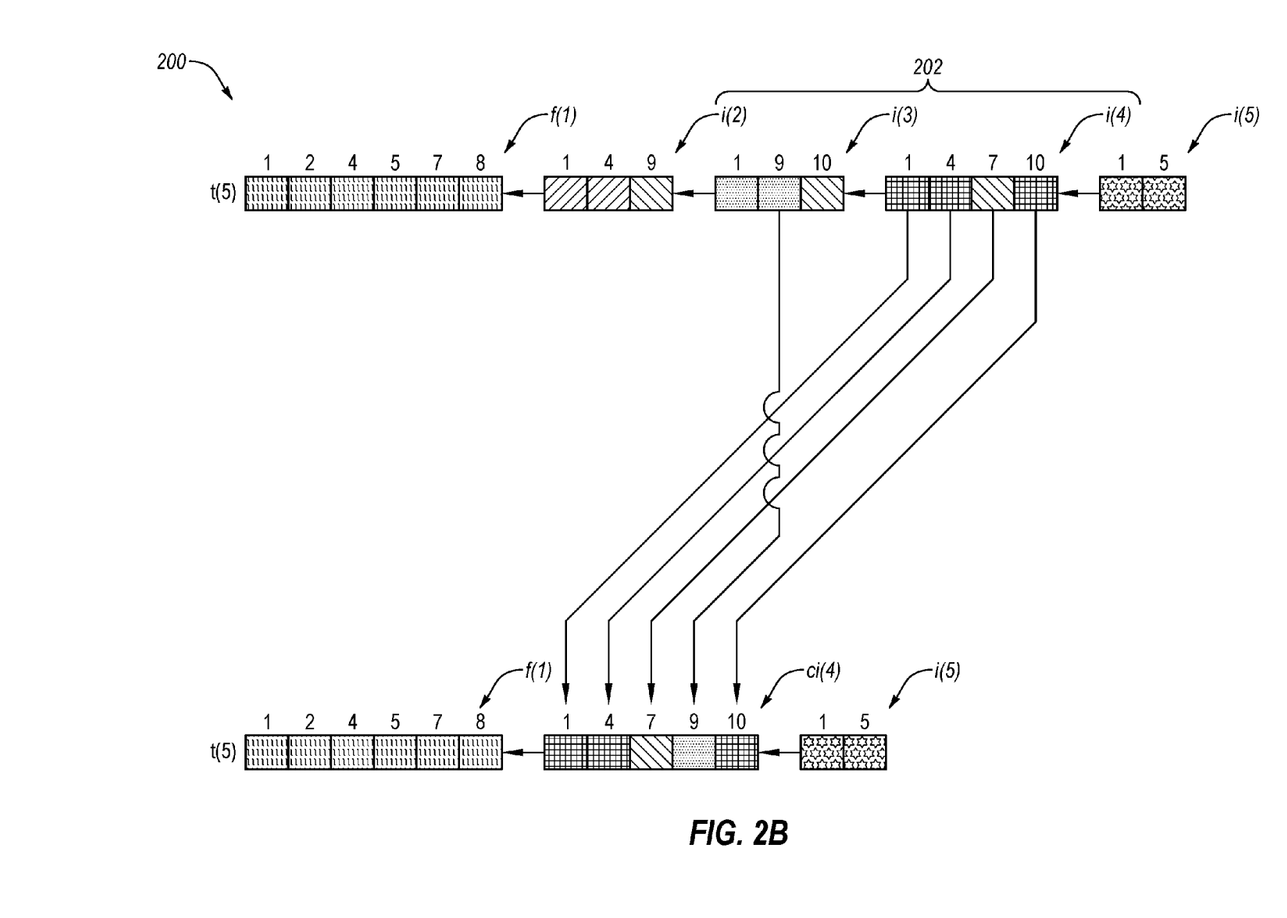
FIG. 2B is a schematic block diagram illustrating an example consolidation of a set of encrypted incremental image backups in the encrypted incremental image backup chain of FIG. 2A.

FIG. 2B is a schematic block diagram illustrating an example consolidation of a set 202 of encrypted incremental image backups in the encrypted incremental image backup chain 200 of FIG. 2A. As disclosed in FIG. 2B, the set 202 of encrypted incremental image backups includes sequential encrypted incremental image backups i(2), i(3), and i(4). The example consolidation of the set 202 of encrypted incremental image backups illustrated in FIG. 2B may be performed in order to decrease the number of image backups in the encrypted incremental image backup chain 200 and/or to decrease the size of the encrypted incremental image backup chain 200, as discussed below.

As disclosed in FIG. 2B, the consolidating of the set 202 of encrypted incremental image backups may include identifying a list of unique block positions (1), (4), (7), (9), and (10) of blocks included in the set 202. Next, a set of newest blocks from the list of unique block positions (1), (4), (7), (9), and (10) may be identified. This identification may be accomplished by examining the block positions of the blocks stored in the set 202. For example, the set 202 may be searched backward, from the newest encrypted incremental image backup i(4), for the newest block for each of the set of newest blocks, resulting in the newest block having the positions (1), (4), (7), and (10) being found in the encrypted incremental image backup i(4), and the newest block having the position (9) being found in the encrypted incremental image backup i(3).

Finally, the consolidated encrypted incremental image backup ci(4) may be created that includes the newest blocks from block positions (1), (4), (7), (9), and (10) that were found during the searching of the set 202. Finally, the set 202 of encrypted incremental image backups may be deleted and replaced with the consolidated encrypted incremental image backup ci(4), as disclosed in FIG. 2B. This deletion may occur immediately after the consolidated encrypted incremental image backup ci(4) has been created, or this deletion can occur later, such as according to a policy dictated by the user in which the user may specify a time period or number of backups after which the set 202 will be deleted.

Although the consolidation of the set 202 eliminates the ability to restore the source storage to the states at times t(2) and t(3), the consolidation of the set 202 decreases the number of image backups in the encrypted incremental image backup chain 200 from five to three and decreases the size of the encrypted incremental image backup chain 200 from 18 blocks to 13 blocks. Therefore, once the ability to restore the source storage 108 to the states at times t(2) and t(3) is no longer desired, consolidation of the encrypted incremental image backups i(2) and i(3) (which represent the states of the source storage 108 at times t(2) and t(3), respectively) and the encrypted incremental image backup i(4) into the consolidated encrypted incremental image backup ci(4) may decrease the number of encrypted incremental image backups in the encrypted incremental image backup chain 200, may decrease the overall size requirements of the third-party destination storage 110 where the encrypted incremental image backup chain 200 is stored, may decrease the bandwidth overhead of transporting the encrypted incremental image backup chain 200, or may decrease the processing time associated with restoring one or more of the image backups in the encrypted incremental image backup chain 200, or some combination thereof.

Further, the individual encryption of the blocks in the set 202 during the creation of the encrypted incremental image backups enables the consolidation of the set 202 without decrypting any of the encrypted blocks. Therefore, the consolidation disclosed in FIG. 2B may be performed by a third-party on a third-party destination storage without the third party having access to any encryption key that was employed during the individual encryption of the encrypted blocks, and without exposing the encrypted image backup to the vulnerabilities that such access may entail.

Figure 3A:
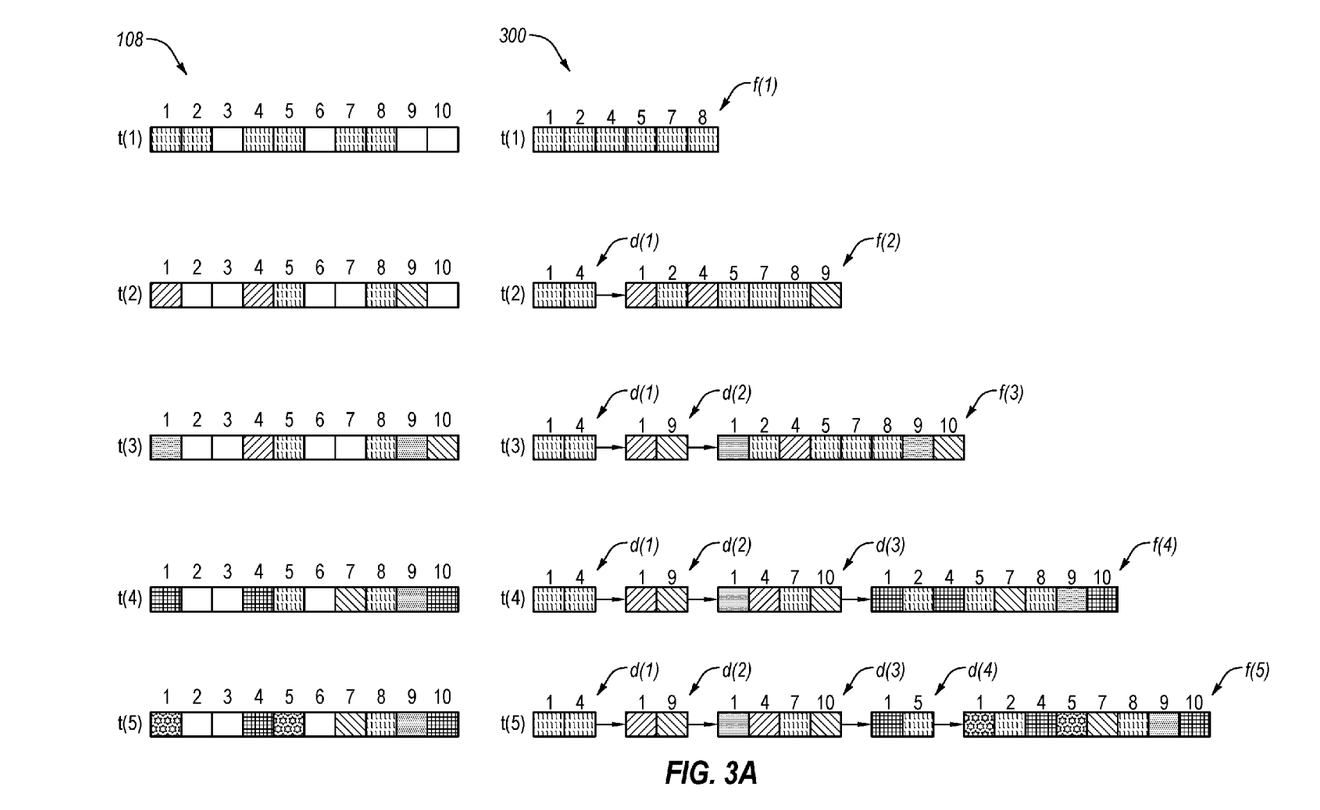
FIG. 3A is a schematic block diagram illustrating the example source storage of FIG. 2A and an example encrypted decremental image backup chain.

FIG. 3A is a schematic block diagram illustrating the example source storage 108 and the example encrypted decremental image backup chain 300 of FIG. 1. In particular, FIG. 3A discloses the states of the source storage 108 at times t(1), t(2), t(3), t(4), and t(5) and discloses the example encrypted decremental image backup chain 300 representing the states of the source storage 108 at times t(1), t(2), t(3), t(4), and t(5).

As disclosed in FIG. 3A, the encrypted decremental image backup chain 300 includes encrypted full image backups f(1), f(2), f(3), f(4), and f(5), which represent the states of the source storage 108 at times t(1), t(2), t(3), t(4), and t(5), respectively. In addition, the encrypted decremental image backup chain 300 includes encrypted decremental image backups d(1), d(2), d(3), and d(4), which represent the states of the source storage 108 at times t(1), t(2), t(3), and t(4), respectively. In one example embodiment, the backup module 114 of FIG. 1 creates the encrypted full image backups f(1), f(2), f(3), f(4), and f(5) and the encrypted decremental image backups d(1), d(2), d(3), and d(4) of the source storage 108 and stores them in the third-party destination storage 110.

As disclosed in FIGS. 1 and 3A, the encrypted full image backup f(1) in the encrypted decremental image backup chain 300 may be created to capture the state of the source storage 108 at time t(1), and may generally be created in a similar manner as the creation of, and include the same blocks as, the encrypted full image backup f(1) in the encrypted incremental image backup chain 200 of FIG. 2A, although the format of the encrypted full image backup f(1) in the encrypted decremental image backup chain 300 may be different due to the encrypted full image backup f(1) in the encrypted decremental image backup chain 300 being formatted for use in the encrypted decremental image backup chain 300 instead of the encrypted incremental image backup chain 200. In particular, the encrypted full image backup f(1) in the encrypted decremental image backup chain 300 may have a randomly-writeable format in order to allow the encrypted full image backup f(1) in the encrypted decremental image backup chain 300 to have new blocks inserted into the encrypted full image backup f(1) at various positions, while the encrypted full image backup f(1) in the encrypted incremental image backup chain 200 may have only a sequentially-writeable format since the encrypted full image backup f(1) in the encrypted incremental image backup chain 200 may not ever need to have new blocks inserted therein at various positions.

Next, the encrypted decremental image backup d(1) may be created to capture the state of the source storage 108 at time t(1) while the encrypted full image backup f(1) is updated to capture the state of the source storage 108 at time t(2), resulting in the updated encrypted full image backup f(2). This may be accomplished by the backup module 114 identifying allocated blocks in the source storage 108 that changed between time t(1) and time t(2), as well as newly-allocated blocks that were allocated in the source storage 108 between time t(1) and time t(2). In this example, blocks (1) and (4) in the source storage 108 were changed, and block (9) in the source storage 108 was newly allocated. The backup module 114 may then identify original blocks in the encrypted full image backup f(1) with the same positions as the changed allocated blocks in the source storage 108, namely, the blocks (1) and (4) in the encrypted full image backup f(1), and copy these original blocks (1) and (4) from the encrypted full image backup f(1) into the encrypted decremental image backup d(1). The changed allocated blocks and newly-allocated blocks from the source storage 108, namely, the changed allocated blocks (1) and (4) and newly-allocated block (9) of the source storage 108, may then be individually encrypted and then copied to the encrypted full image backup f(1), resulting in the updated encrypted full image backup f(2). As a result, the encrypted decremental image backup d(1) represents the state of the source storage 108 at time t(1) and the updated encrypted full image backup f(2) represents the state of the source storage 108 at time t(2). The individual encryption of blocks during the updating of the encrypted full image backup f(1) (resulting in the updated encrypted full image backup f(2)) may be performed using the single encryption function and/or the single encryption key that was used during the creation of encrypted full image backup f(1). The state of the source storage 108 at time t(2) may also be captured using snapshot technology in order to capture the data stored in the source storage 108 at time t(2) without interrupting other processes, thus avoiding downtime of the source storage 108.

Further, additional encrypted decremental image backups, such as the encrypted decremental image backups d(2), d(3), and d(4), and corresponding updated encrypted full image backups f(3), f(4), and f(5), respectively, may be created on an ongoing basis, in a manner similar to the creation of the encrypted decremental image backup d(1) and the updating of the encrypted full image backup f(1). The frequency of creating new encrypted decremental image backups in the encrypted decremental image backup chain 300 may be altered as desired in order to adjust the amount of data that will be lost should the source storage 108 experience corruption of its stored data or become unavailable at any given point in time. The blocks from the source storage 108 can be restored to the state at the point in time of a particular encrypted decremental image backup by applying the image backups to the restore storage 112 from newest to oldest, namely, first applying the current encrypted full image backup and then applying each successive encrypted decremental image backup back to the particular encrypted decremental image backup. For example, the data from the source storage 108 can be restored to the state at time t(2), after time t(5), by applying the encrypted full image backup f(5) and then successively applying the encrypted decremental image backups d(4), d(3), and d(2). Alternatively, the data from the source storage 108 can be restored to the state at the point in time of a particular encrypted decremental image backup by applying the image backups to the restore storage 112 concurrently, namely, concurrently applying the current encrypted full image backup and each successive encrypted decremental image backup back to the particular encrypted decremental image backup. For example, the data from the source storage 108 may be restored to the state at time t(2), after time t(5), by accessing the encrypted full image backup f(5) and the encrypted decremental image backups d(4), d(3), and d(2) concurrently, and retrieving from each backup the correct block content corresponding to time t(2). Advantageously, the most recent backup state of the source storage 108 can be restored at any stage of the encrypted decremental image backup chain 300 by simply applying the current encrypted full image backup of the encrypted decremental image backup chain 300. It is understood that any such restoration of an encrypted image backup may also include not decrypting any encrypted blocks, or decrypting some or all of the encrypted blocks.

In general, as compared to the encrypted full image backup f(1), the encrypted decremental image backup d(1) may take a relatively short period of time to create and consume a relatively small storage space in the third-party destination storage 110. However, as compared to the encrypted incremental image backup i(2), the encrypted decremental image backup d(1) may take a relatively longer period of time to create, due at least in part to the updating of the corresponding encrypted full image backup f(2) that is associated with the encrypted decremental image backup d(1). In addition to taking longer to create, the creation of the encrypted decremental image backup d(1) may also be more resource intensive than the creation of the encrypted incremental image backup i(2). Further, the creation of the encrypted decremental image backup d(1) may require exclusive access to the corresponding encrypted full image backup f(2), while the creation of the encrypted incremental image backup i(2) may be accomplished without exclusive access to the encrypted full image backup f(1). Due at least in part to the relative advantages and disadvantages of encrypted incremental image backups versus encrypted decremental image backups, the example methods disclosed herein may be employed with either or both of encrypted incremental image backup chains and encrypted decremental image backup chains, as well as employment in encrypted hybrid incremental/decremental image backup chains.

Figure 3B:
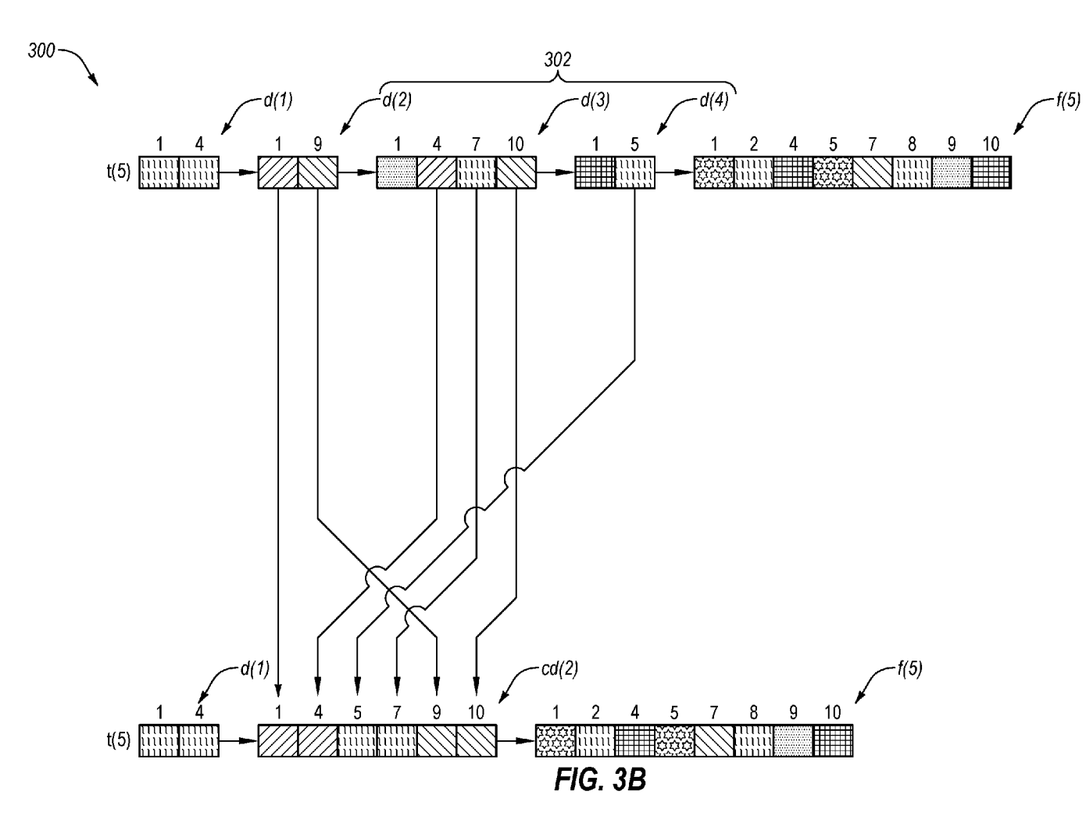
FIG. 3B is a schematic block diagram illustrating an example consolidation of a set of encrypted decremental image backups in the encrypted decremental image backup chain of FIG. 3A.

FIG. 3B is a schematic block diagram illustrating an example consolidation of a set 302 of encrypted decremental image backups in the encrypted decremental image backup chain 300. As disclosed in FIG. 3B, the set 302 of encrypted decremental image backups includes sequential encrypted decremental image backups d(2), d(3), and d(4). The example consolidation of the set 302 of encrypted decremental image backups illustrated in FIG. 3B may be performed in order to decrease the number of image backups in the encrypted decremental image backup chain 300 and/or to decrease the size of the encrypted decremental image backup chain 300, as discussed below.

As disclosed in FIG. 3B, the consolidating of the set 302 of encrypted decremental image backups may include identifying a list of unique block positions (1), (4), (5), (7), (9), and (10) of blocks included in the set 302. Next, a set of oldest blocks from the list of unique block positions (1), (4), (5), (7), (9), and (10) may be identified. This identification may be accomplished by examining the block positions of the blocks stored in the set 302. For example, the set 302 of encrypted decremental image backups may be searched forward, from the oldest encrypted decremental image backup d(2), for the oldest block for each of the set of oldest blocks, resulting in the oldest block having the positions (1) and (9) being found in the encrypted decremental image backup d(2), the oldest block having the positions (4), (7), and (10) being found in the encrypted decremental image backup d(3), and the oldest block having the position (5) being found in the encrypted decremental image backup d(4).

Next, the consolidated encrypted decremental image backup cd(2) may be created that includes the oldest blocks from block positions (1), (4), (5), (7), (9), and (10) that were found during the searching of the set 302. Finally, the set 302 of encrypted decremental image backups may be deleted and replaced with the consolidated encrypted decremental image backup cd(2), as disclosed in FIG. 3B. This deletion may occur immediately after the consolidated encrypted decremental image backup cd(2) has been created, or this deletion can occur later, such as according to a policy dictated by the user.

Although the consolidation of the set 302 eliminates the ability to restore the source storage to the states at times t(3) and t(4), the consolidation of the set 302 decreases the number of image backups in the encrypted decremental image backup chain 300 from five to three and decreases the size of the encrypted decremental image backup chain 300 from 18 blocks to 16 blocks. Therefore, once the ability to restore the source storage 108 to the states at times t(3) and t(4) is no longer desired, consolidation of the encrypted decremental image backups d(3) and d(4) (which represent the states of the source storage 108 at times t(3) and t(4), respectively) and the encrypted decremental image backup d(2) into the consolidated encrypted decremental image backup cd(2) may decrease the number of encrypted decremental image backups in the encrypted decremental image backup chain 300, may decrease the overall size requirements of the third-party destination storage 110 where the encrypted decremental image backup chain 300 is stored, may decrease the bandwidth overhead of transporting the encrypted decremental image backup chain 300, or may decrease the processing time associated with restoring one or more of the image backups in the encrypted decremental image backup chain 300, or some combination thereof.

Further, the individual encryption of the blocks in the set 302 during the creation of the encrypted decremental image backups enables the consolidation of the set 302 without decrypting any of the encrypted blocks. Therefore, the consolidation disclosed in FIG. 3B may be performed by a third-party on a third-party destination storage without the third party having access to any encryption key that was employed during the individual encryption of the encrypted blocks, and without exposing the encrypted image backup to the vulnerabilities that such access may entail.

Although only allocated blocks are included in the example encrypted incremental image backup chain 200 and in the example encrypted decremental image backup chain 300 discussed above, it is understood that in alternative implementations both allocated and free blocks may be backed up during the creation of an encrypted full image backup, an encrypted incremental image backup, or an encrypted decremental image backup. This is typically done for forensic purposes, because the contents of free blocks can be interesting where the free blocks contain data from a previous point in time when the blocks were in use and allocated. Therefore, the creation of encrypted full image backups, encrypted incremental image backups, and encrypted decremental image backups as disclosed herein is not limited to allocated blocks but may also include free blocks.

Figure 4:
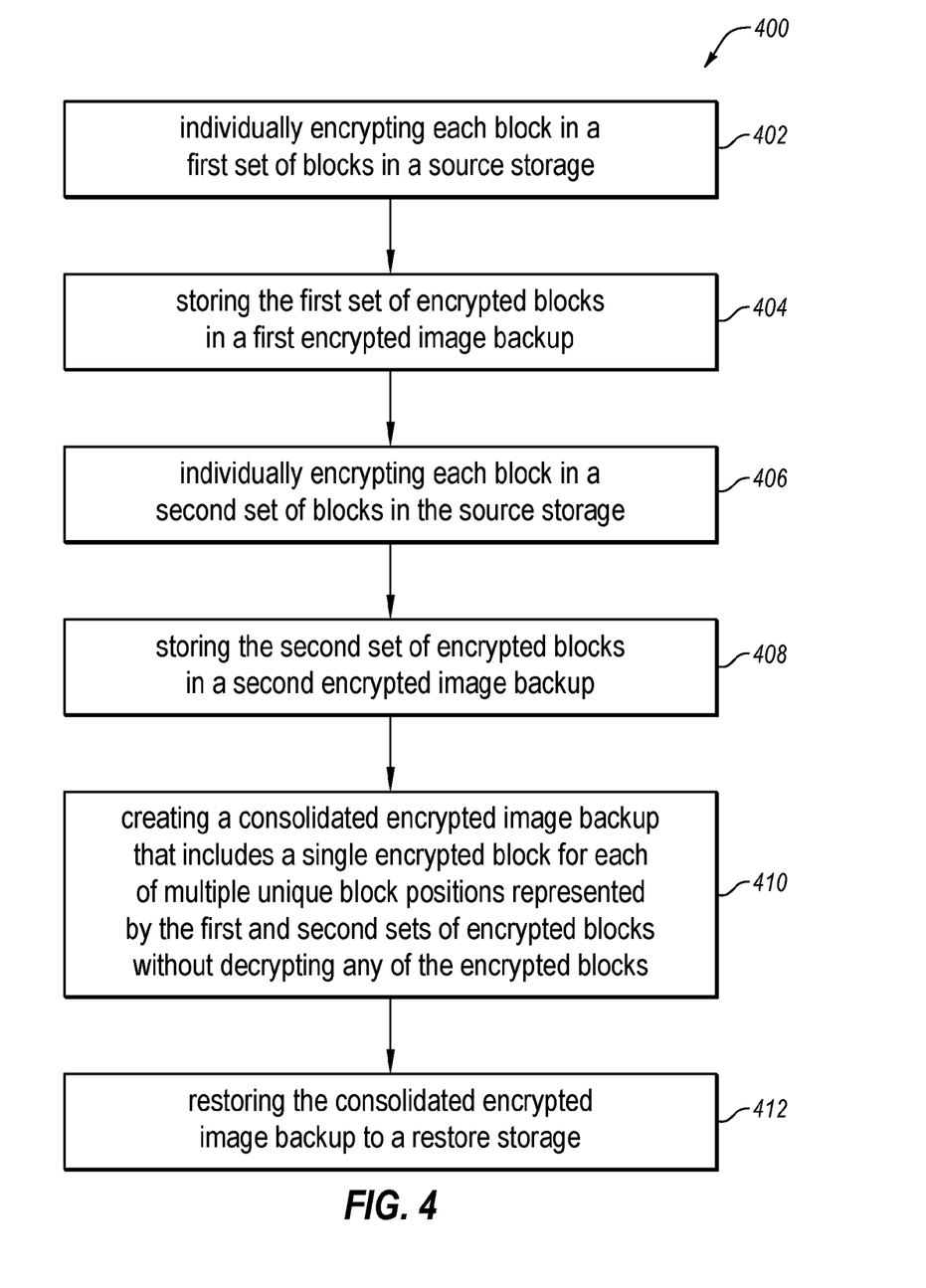
FIG. 4 is a schematic flowchart diagram of an example method for consolidating encrypted image backups without decryption.

FIG. 4 is a schematic flowchart diagram of an example method 400 for consolidating encrypted image backups without decryption. The method 400 may be implemented, in at least some embodiments, by one or more of the backup module 114, the consolidation module 116, and the restore module 118 of FIG. 1. For example, the backup module 114, the consolidation module 116, and the restore module 118 may each be one or more programs, stored on one or more non-transitory computer-readable media, that are configured, when executed, to cause one or more processors to perform one or more of the steps of the method 400.

Although illustrated as discrete steps, various steps may be divided into additional steps, combined into fewer steps, reordered, or eliminated, depending on the desired implementation. The method 400 will be discussed with reference to FIGS. 1, 2A, 2B, 3A, 3B, and 4.

The method 400 of FIG. 4 may include step 402 of individually encrypting each block in a first set of blocks in a source storage. For example, the backup module 114 of FIG. 1 may individually encrypt, at step 402, the allocated blocks (1), (4), and (9) from the source storage 108 at time t(2), as disclosed in FIG. 2A. In another example, the backup module 114 of FIG. 1 may individually encrypt, at step 402, the changed allocated blocks (1) and (9) from the source storage 108 at time t(2), as disclosed in FIG. 3A.

The method 400 of FIG. 4 may include step 404 of storing the first set of encrypted blocks in a first encrypted image backup. For example, the backup module 114 of FIG. 1 may store, at step 404, the individually encrypted blocks (1), (4), and (9) in the encrypted incremental image backup i(2), as disclosed in FIG. 2A. In another example, the backup module 114 of FIG. 1 may store, at step 404, the individually encrypted blocks (1) and (9) in the encrypted decremental image backup d(2), as disclosed in FIG. 3A.

The method 400 of FIG. 4 may include step 406 of individually encrypting each block in a second set of blocks in the source storage. For example, the backup module 114 of FIG. 1 may individually encrypt, at step 406, the allocated blocks (1), (9), and (10) from the source storage 108 at time t(3), as disclosed in FIG. 2A. In another example, the backup module 114 of FIG. 1 may individually encrypt, at step 406, the changed allocated blocks (4) and (7) from the source storage 108 at time t(2) and the changed allocated blocks (1) and (10) from the source storage 108 at time t(3), as disclosed in FIG. 3A.

The individual encryption at the steps 402 and 406 may be performed using a single encryption function and/or a single encryption key. The single encryption function may be, for example, an Advanced Encryption Standard (AES)-128, an AES-160, an AES-192, an AES-224, an AES-256, a Blowfish, a Twofish, a Threefish, or a Serpent encryption function. Further, the individual encryption at steps 402 and 406 may be performed using a salt which is associated with a unique block position in the source storage represented by the encrypted block. For example, the backup module 114 of FIG. 1 may individually encrypt, at step 406, the changed allocated block (4) from the source storage 108 at time t(4), as disclosed in FIG. 3A, using an AES-256 encryption function and using a salt which is associated with the unique block position (4).

The method 400 of FIG. 4 may include step 408 of storing the second set of encrypted blocks in a second encrypted image backup. For example, the backup module 114 of FIG. 1 may store, at step 408, the individually encrypted blocks (1), (9), and (10) in the encrypted incremental image backup i(3), as disclosed in FIG. 2A. In another example, the backup module 114 of FIG. 1 may store, at step 404, the individually encrypted blocks (1), (4), (7), and (10) in the encrypted decremental image backup d(3), as disclosed in FIG. 3A.

The method 400 of FIG. 4 may include step 410 of creating a consolidated encrypted image backup that includes a single encrypted block for each of multiple unique block positions represented by the first and second sets of encrypted blocks without decrypting any of the encrypted blocks. For example, the consolidation module 116 of FIG. 1 may create, at step 410, the consolidated encrypted incremental image backup ci(4) that includes a single encrypted block for each of multiple unique block positions represented by the first and second sets of encrypted blocks from steps 402 and 406, namely block positions (1), (4), (9), and (10), without decrypting any of the encrypted blocks, as disclosed in FIG. 2B. In another example, the consolidation module 116 of FIG. 1 may create, at step 410, the consolidated encrypted decremental image backup cd(2) that includes a single encrypted block for each of multiple unique block positions represented by the first and second sets of encrypted blocks from steps 402 and 406, namely block positions (1), (4), (7), (9), and (10), without decrypting any of the encrypted blocks, as disclosed in FIG. 3B.

The method 400 of FIG. 4 may include step 412 of restoring the consolidated encrypted image backup to a restore storage. For example, the restore module 118 of FIG. 1 may restore, at step 412, the consolidated encrypted incremental image backup ci(4) of FIG. 2B to the restore storage 112. In another example, the restore module 118 of FIG. 1 may restore, at step 412, the consolidated encrypted decremental image backup cd(2) of FIG. 3B to the restore storage 112. The restoration at step 412 may be performed by copying each encrypted block in the consolidated encrypted image backup into a corresponding unique block position in the restore storage without decrypting any encrypted blocks. Alternatively, the restoration at step 412 may be performed by decrypting each block in the consolidated encrypted image backup and copying each decrypted block into a corresponding unique block position in the restore storage.

Therefore, the example method 400 disclosed herein may be employed to individually encrypt blocks in image backups in order to enable consolidation of the image backups without decrypting any of the encrypted blocks. Therefore, the consolidation performed in the example method 400 may be performed without having access to any encryption key that was employed during the individual encryption of the encrypted blocks, and without exposing the encrypted image backup to the vulnerabilities that such access may entail.

It is understood that the foregoing discussion of the method 400 is but one possible implementation of a method for consolidating encrypted image backups without decryption, and various modifications are possible and contemplated. For example, the method 400 may be modified to combine the steps 402 and 404 and/or the steps 406 and 408. Further, the method 400 may be modified to delete the step 412, for example.

Further, the method 400 may improve the functioning of a computer itself. For example, the functioning of the source system 102 (i.e., a computing device capable of supporting a storage and communicating with other systems) itself may be improved by the method 400 at least because the backing up of the source storage 108 of the source system 102 that occurs in the method 400 may enable the restoration of the source storage 108 if, for example, the source storage 108 experiences corruption of its stored data, the source storage 108 becomes unavailable, or a user wishes to create a second identical or virtual source storage 108. Also, the method 400 may improve the technical field of backup and disaster recovery (BDR). For example, the technical field of BDR may be improved by the method 400 at least because prior art image backups of the source storage 108 did not enable individual encrypting of blocks in image backups such that consolidation of the image backups was possible without decryption of the encrypted blocks, whereas the method 400 may be employed to enable such individual encrypting of blocks in image backups, thus improving the collapsibility of the resulting image backups.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for consolidating encrypted image backups without decryption, the method comprising:

individually encrypting, using a single encryption key, each block in a first set of blocks in a source storage at a first point in time, each of the blocks in the first set of blocks corresponding to a unique block position in the source storage;

storing the first set of encrypted blocks in a first encrypted image backup;

individually encrypting, using the single encryption key, each block in a second set of blocks in the source storage at a second point in time, at least one of the blocks in the second set of blocks corresponding to the same block position in the source storage as one of the blocks in the first set of blocks;

storing the second set of encrypted blocks in a second encrypted image backup;

creating a consolidated encrypted image backup that includes a single encrypted block for each of multiple unique block positions represented by the first and second sets of encrypted blocks without decrypting any of the encrypted blocks; and restoring the consolidated encrypted image backup to a restore storage.

2. The method as recited in claim 1, wherein at least one of the first and second encrypted image backups is an encrypted incremental image backup.

3. The method of claim 1, wherein at least one of the first and second encrypted image backups is an encrypted decremental image backup.

4. The method of claim 1, wherein each block in the source storage is a cluster or a sector of the source storage.

5. The method of claim 1, wherein the first and second sets of encrypted blocks are encrypted using a single encryption key.

6. The method of claim 5, wherein the creating of the consolidated encrypted image backup is performed without using the single encryption key.

7. The method of claim 1, wherein each encrypted block in the first and second sets of encrypted blocks is individually encrypted using a salt which is associated with a unique block position in the source storage represented by the encrypted block.

8. The method of claim 1, wherein:
the encrypting of the first set of blocks and the second set of blocks is performed at the source storage;
the creating of the consolidated encrypted image backup is performed at a third-party storage;
the single encryption key is stored at the source storage; and
the single encryption key is not stored at the third-party storage.

9. The method of claim 1, wherein the restoring of the consolidated encrypted image backup to the restore storage includes:
copying each encrypted block from the consolidated encrypted image backup;
decrypting each of the copied encrypted blocks; and
storing each decrypted block in a corresponding unique block position in the restore storage.

10. The method of claim 1, wherein the restoring of the consolidated encrypted image backup to the restore storage includes:
copying each encrypted block from the consolidated encrypted image backup;
storing each of the copied encrypted blocks in a corresponding unique block position in the restore storage; and
decrypting at least some of the encrypted blocks stored in the restore storage.

11. One or more non-transitory computer-readable media storing one or more programs that are configured, when executed, to cause one or more processors to execute a method for consolidating encrypted image backups without decryption, the method comprising:
individually encrypting, using a single encryption key, each block in a first set of blocks in a source storage at a first point in time, each of the blocks in the first set of blocks corresponding to a unique block position in the source storage;
storing the first set of encrypted blocks in a first encrypted image backup;
individually encrypting, using the single encryption key, each block in a second set of blocks in the source storage at a second point in time, at least one of the blocks in the second set of blocks corresponding to the same block position in the source storage as one of the blocks in the first set of blocks;
storing the second set of encrypted blocks in a second encrypted image backup;
creating a consolidated encrypted image backup that includes a single encrypted block for each of multiple unique block positions represented by the first and second sets of encrypted blocks without decrypting any of the encrypted blocks; and
restoring the consolidated encrypted image backup to a restore storage.

12. A method for consolidating encrypted image backups in an image backup chain without decryption, the method comprising:
individually encrypting, at a source storage and using a single encryption function and a single encryption key accessible to the source storage, each block in a first set of blocks in the source storage at a first point in time, each of the blocks in the first set of blocks corresponding to a unique block position in the source storage;
storing the first set of encrypted blocks in a first encrypted image backup in an image backup chain;
individually encrypting, using the single encryption function and the single encryption key, each block in a second set of blocks in the source storage at a second point in time, at least one of the blocks in the second set of blocks corresponding to the same block position in the source storage as one of the blocks in the first set of blocks;
storing the second set of encrypted blocks in a second encrypted image backup in the image backup chain; and
creating, at a third-party storage that does not have access to the single encryption key, a consolidated encrypted image backup in the image backup chain that includes a single encrypted block for each of multiple unique block positions represented by the first and second sets of encrypted blocks without decrypting any of the encrypted blocks.

13. The method as recited in claim 12, wherein:
the first encrypted image backup is an encrypted full image backup or an encrypted incremental image backup; and
the second encrypted image backup is an encrypted incremental image backup.

14. The method as recited in claim 13, wherein:
the encrypted full image backup has a ShadowProtect Full (SPF) image backup format; and
the encrypted incremental image backup has a ShadowProtect Incremental (SPI) image backup format.

15. The method as recited in claim 12, wherein:
the first encrypted image backup is an encrypted decremental image backup; and
the second encrypted image backup is an encrypted decremental image backup or an encrypted full image backup.

16. The method of claim 12, wherein each block in the source storage is a cluster or a sector of the source storage.

17. The method of claim 12, wherein each encrypted block in the first and second sets of encrypted blocks is individually encrypted using a salt which is associated with a unique block position in the source storage represented by the encrypted block.

18. The method of claim 12, wherein the single encryption function is an Advanced Encryption Standard (AES)-128, an AES-160, an AES-192, an AES-224, an AES-256, a Blowfish, a Twofish, a Threefish, or a Serpent encryption function.

19. The method of claim 12, further comprising restoring the consolidated encrypted image backup to a restore storage by:
- copying each encrypted block from the consolidated encrypted image backup;
- storing each encrypted block in a corresponding unique block position in the restore storage; and
- decrypting at least some of the encrypted blocks either before or after the storing of the blocks in the restore storage.

20. One or more non-transitory computer-readable media storing one or more programs that are configured, when executed, to cause one or more processors to execute a method for consolidating encrypted image backups in an image backup chain without decryption, the method comprising:
- individually encrypting, at a source storage and using a single encryption function and a single encryption key accessible to the source storage, each block in a first set of blocks in the source storage at a first point in time, each of the blocks in the first set of blocks corresponding to a unique block position in the source storage;
- storing the first set of encrypted blocks in a first encrypted image backup in an image backup chain;
- individually encrypting, using the single encryption function and the single encryption key, each block in a second set of blocks in the source storage at a second point in time, at least one of the blocks in the second set of blocks corresponding to the same block position in the source storage as one of the blocks in the first set of blocks;
- storing the second set of encrypted blocks in a second encrypted image backup in the image backup chain; and
- creating, at a third-party storage that does not have access to the single encryption key, a consolidated encrypted image backup in the image backup chain that includes a single encrypted block for each of multiple unique block positions represented by the first and second sets of encrypted blocks without decrypting any of the encrypted blocks.

* * * * *